(12) United States Patent
Zhang

(10) Patent No.: US 8,146,639 B2
(45) Date of Patent: Apr. 3, 2012

(54) EQUIPMENT AND METHOD FOR MANUFACTURING STEEL-PLASTIC COMPOSITE PIPE

(76) Inventor: Mingwei Zhang, Ningbo (CN)

( * ) Notice: Subject to any disclaimer, the term of this patent is extended or adjusted under 35 U.S.C. 154(b) by 147 days.

(21) Appl. No.: 12/525,737

(22) PCT Filed: Aug. 7, 2008

(86) PCT No.: PCT/CN2008/001438
§ 371 (c)(1),
(2), (4) Date: Aug. 4, 2009

(87) PCT Pub. No.: WO2009/018721
PCT Pub. Date: Feb. 12, 2009

(65) Prior Publication Data
US 2010/0089517 A1    Apr. 15, 2010

(30) Foreign Application Priority Data
Aug. 9, 2007   (CN) .......................... 2007 1 0140523

(51) Int. Cl.
*B32B 41/00*   (2006.01)
(52) U.S. Cl. ........ 156/356; 156/359; 156/362; 156/367; 156/368; 156/392
(58) Field of Classification Search ............ 156/51, 156/356, 359, 362, 367, 368, 392; 138/127
See application file for complete search history.

(56) References Cited

U.S. PATENT DOCUMENTS
6,911,089 B2 *   6/2005   Latvis .......................... 118/667
2005/0016607 A1 *   1/2005   St. Onge et al. ................ 138/93

FOREIGN PATENT DOCUMENTS
CN   86105672   4/1988
(Continued)

OTHER PUBLICATIONS

PCT Search Report, PCT/CN2008/001438, Nov. 20, 2008, Applicant: Zhang, Mingwei.
PCT Written Opinion, PCT/CN2008/001438, Nov. 7, 2008, Applicant: Zhang, Mingwei (English Translation).

(Continued)

*Primary Examiner* — George Koch
(74) *Attorney, Agent, or Firm* — Pedersen and Company, PLLC; Ken J. Pedersen; Barbara S. Pedersen

(57) ABSTRACT

The present invention refers to a process and an apparatus for combination of steel tubes or pipes with plastic linings, in which steam is used as heat carrier to heat the steel tubes or pipes lined with linings. The apparatus comprises a multifunctional combining chamber, a multifunctional carriage for conveying tubes or pipes, an arrangement for steam circulating, which continuously supplies re-usable steam, a cooling and shaping arrangement and a controlling device. The steam circulating system comprises a furnace for re-heating the steam and means for supplying supplementing steam. The percentage of passing the qualification control is increased up to 99.9% by embodiment of the method and/or apparatus according to the present invention, while it is only 97% by a conventional apparatus, and the production capacity is increased by 15%. Thanks to the recovery and re-use of the steam in a circulating system, it will use only three tons of steam if the daily production is forty tons in a production line, and 405 RMB will be saved in a day. Thanks to the recovery and re-use of water in a circulating system, the water consumption for producing a ton steel and plastic combined tubes or pipes will be reduced by 8%. That means a remarkable economic and environmental value. The present invention will decrease the labor intensity of the workers and the cost that refers to the work time by 5%. The total cost for a ton tubes or pipes will be reduced by 10 RMB.

4 Claims, 3 Drawing Sheets

FOREIGN PATENT DOCUMENTS

| | | |
|---|---|---|
| CN | 1134528 | 10/1996 |
| CN | 1435312 | 8/2003 |
| CN | 1663778 | 9/2005 |
| EP | 0531790 | 3/1993 |
| WO | WO2004/011231 | 2/2004 |

OTHER PUBLICATIONS

PCT Preliminary Examination Report, PCT/CN2008/001438, Feb. 9, 2010, Applicant: Zhang, Mingwei (English Translation).

* cited by examiner

EQUIPMENT AND METHOD FOR MANUFACTURING STEEL-PLASTIC COMPOSITE PIPE

This application is a 371 National Entry Application of PCT/CN08/001438, international filing date Aug. 7, 2008, which PCT Application claims priority of Chinese Patent Application Number 200710140523.6, filed Aug. 9, 2007.

FIELD OF THE INVENTION

The present invention refers to manufacture of steel tubes or pipes lined with plastic linings, especially to an apparatus and a method for combining steel tubes or pipes with plastic linings.

BACKGROUND OF THE INVENTION

Steel tubes or pipes lined with plastic linings is a new water supplying material in buildings, which is a substitute for tubes which are made of only plastic thanks to the corrosion-resistant inner side and high strength due to the outside steel, and is more and more popular in the market. Some of conventional steel tubes or pipes are combined with their plastic linings by using electricity, oil, gas or natural gas to heat steel tubes or pipes and heat the plastic linings through transferring of the heat from the steel tubes or pipes to the plastic linings, wherein the heat is produced by using electricity, oil, gas or natural gas and carried by wind to heat the tubes or pipes directly with the hot wind, which results in un-uniform heating and loose adhesion of the steel tube or pipe with its lining or bad adhesion in some parts, which in turn tends to cause divorce of the lining from the steel tube or pipe after expansion and contraction due to temperature difference and cause un-alignment of the ends of the steel tube or pipe with the ends of the plastic lining, and cause contraction of the plastic lining so that the quality of the steel tube or pipe lined with plastic lining is not the optimum While others are produced by binding the plastic linings to the inner sides of the steel tubes or pipes with adhesive or binder, e.g. WO2004/011231.

Any process in the prior art for manufacture of steel and plastic combined tubes or pipe is among the labor intensive industries, which is not equipped with matching NC equipments or conveying arrangements and is not in good condition in view of mechatronics, and therefore needs hard working with the disadvantage of low control precision and high rate of defective products. Furthermore, products with steel tubes or pipes of different spec or thick of wall, or with linings of different plastic can not be produced at different environmental temperature and/or different environmental humidity.

SUMMARY OF THE INVENTION

The purpose of the invention is to provide an apparatus and method for manufacture of steel tubes or pipes lined with plastic linings, which will solve the above problems in the prior art and by which steel tubes or pipes lined with plastic linings will be produced with low labor intensity, high quality, high pass rate and high yield.

Mr. Zhang Mingwei, the inventor and applicant of the present invention found during his long time practice and study that good binding between the linings and the steel tubes or pipes can be achieved if steam is used as heat source, instead of electricity, oil, gas and natural gas to generate heat for combination of the steel tubes or pipes with the linings. At first, it is at the outer layer where steam heats the tubes or pipes. That results not only simpler in view of technology, but also heating and pressing more uniformly, and has better effect compared with heating by means of high frequent electricity and hot wind or increasing pressure inside the tube by means of water as used in the prior art. Test turns out that the steel tube or pipe lined with plastic linings and manufactured in this way is improved substantially in respect of fastness and durability.

Another advantage of the present invention is that it allows using of the waste steam from industry and therefore contributes to energy saving and minimizing exhaust emission as well as minimizing cost of production. It is very easy for a person skilled in the art to understand that it is more economizing and practical to heat by means of steam than directly heating the tube or pipe or heating and increasing pressure by means of water. The present invention allows the manufacture of steel and plastic combined tubes or pipes to take advantages of NC device and an advanced conveying arrangement, realize programmable control and dialog between computer and human, reduce labor intensity by means of high technology, increase producing precision and pass rate, especially control the temperature and pressure appropriately according to the test data and theoretical analysis of the plastic linings, so that the plastic linings are softened to such an extent which is most suitable for binding while without any damage to the material, and allow the steam pressure to be controlled to such an extent under corresponding temperature and softening of the linings that binding of the steel and the plastic without damage to the quality of the tubes or pipes.

In addition, Mr. Zhang Mingwei further found that steam can be used in a circulating system for heating to bind steel and plastic combined tubes or pipes. That is not only in favor of energy saving and minimizing consumption but also make the heat supply stable which in turn increase the quality and the pass rate of the products and also further contribute to energy saving and exhaust reducing. Mr. Zhang not only found these technical solutions but also thoroughly solved the difficulties in these solutions through a series of experiments. Thanks to a series of measurements such as re-heating the recovered steam and real time control of temperature, humidity, pressure and the like parameters at multi-points, it is allowed to embody and improve the advanced thought of producing steel and plastic combined tubes or pipes by means of circulated steam, which consists the base of the solution according to the method and apparatus of the present invention which achieves a qualitative leap in the field of production of steel tubes or pipes combined with plastic linings.

The present invention based on a process for combination of steel tubes or pipes with the plastic linings by means of heating and pressing with steam, comprising the steps of:
  air tight testing to the tubes or pipes in which the linings have been inserted;
  conveying the tubes or pipes that pass the said test into a chamber for heat combining the steel tubes or pipes with their linings, followed by locking and sealing the door of the heat combining chamber;
  turning on the switches of the corresponding electric circuits and fluid circuits according to the requirement of the process to continuously supply the combining chamber with circulating steam and increase temperature and pressure inside the tubes or pipes;
  controlling the process parameters according to the given process by means of a controlling system, and conducting the whole process according to a given process flow, including preheating, increasing the temperature, keeping a constant temperature and stabilizing the pressure;
  lowering the pressure in and unloading the heat combining chamber at a suitable time according to the process flow, and then opening the door to take the tubes or pipes out of the heat combining chamber;

conveying the tubes or pipes into the cooling station to cool and shape them according to the given process flow;

taking the tubes or pipes out of the cooling station according to the process flow.

Said step of increasing pressure inside the tubes or pipes can be carried out by means of filling the tubes or pipes with steam, which result in the advantage of simple in view of process and structure, preferably however filling the tubes or pipes with gas, which not only decreases steam consumption but also contributes to generate a temperature difference between inside and outside of the plastic linings so that the inner side of the linings which does not need binding has a lower temperature and therefore is less softened and damaged.

Preferably, a conveying arrangement is used to convey the said tubes or pipes in the said process. That is to put the steel tubes or pipes in which plastic linings have been inserted on a conveying arrangement and tightly lock them, prior to said step of conveying the tubes or pipes into a chamber for heat combining, wherein the whole conveying arrangement carrying the tubes or pipes moves into the heat combining chamber and moves out of the heat combining chamber along with the tubes or pipes in the step of taking the tubes or pipes out of the heat combining chamber, so that the tubes or pipes can be batch treated.

Preferably, display instruments are used to monitor and control said steps of conducting the whole process according to a given process flow.

Preferably, the door of the steel and plastic heat combining chamber will not be opened after the pressure of the steam chamber is lowered and the chamber is unloaded until an alarm.

Preferably, said process parameters comprise inflow speed and/or flow rate and/or time and/or temperature and/or pressure of the steam and/or pressure of the compressed air. Preferably, said pressure and temperature includes not only that in the combining chamber but also that in the tubes or pipes.

Preferably, in the step of controlling process parameters according to the given process flow, sizes according to the spec and/or the thick and/or amount of manufacture of the tubes or pipes and/or cool water (or hot water) are inputted in response to the request displayed on the display of a computer, as well as the environmental temperature and/or environmental humidity when the process is conducted and the spec and norm of the plastic and the spec and norm of the adhesive. These parameters are inputted preferably in a way of man-computer dialog. Each parameter which was set according to the process, such as inflow speed, flow rate, time, temperature, pressure of the steam and the pressure of the compressed air are automatically detected in the multifunctional heat combining chamber during the whole process, and adjusted automatically by means of an execution controller to make the actual technical parameters meet the given process technical parameters.

Preferably, said controlling system automatically records and restores various technical parameters in the process and/or plot of the technical parameters, and has the functions of copying, retrieving and searching.

Preferably, said cooling and shaping step is conducted by water cooling. The advantage of water cooling, e.g. circulating water spraying or water soakage is fast and uniform.

Alternatively, gas cooling can be used instead of water cooling, which has the advantage of simple and low cost, or combination of water and gas cooling, more preferably, the water cooling system has a system for recovering and circulating water.

Preferably, steam is supplied in a circulation system in the process for producing steel and plastic combined tubes or pipes. Particularly preferably, the steam is re-heated in the circuit for circulating supply of steam to keep the process parameter stable, especially according to heat supplementing requirement detected in the process, to reach the temperature and pressure needed for production of the steel and plastic combined tubes or pipes again. Furthermore, steam can be supplemented in the steam circulating circuit. In other word, a fresh steam source is provided, which either contains a steam generator or takes advantages of pipe supplied industry steam, e.g. steam from power plant or chemical plant. Said steam re-heating and fresh steam supplementing either be provided separately, or combined, i.e. filling the steel and plastic heat combining chamber with both fresh steam and the recovered steam that re-heated by the means for re-heating, to make up for consumption of steam in the production of the steel and plastic combined tubes or pipes. The steam circulation system further contains a steam store, which stores steam recovered and re-heated from a re-heating furnace and fresh steam from the fresh steam source, and then the steam stored in the store is supplied to the heat combining chamber.

Based on the above described process, another subject of the present invention refers to an apparatus for carrying out the process and manufacturing steel and plastic combined tubes or pipes developed by Mr. Zhang Mingwei. As a basic solution of the apparatus, it comprises an arrangement for conveying the tubes or pipes, an arrangement for heat combining of steel and plastic, a steam circulating system, a device for cooling and shaping and corresponding connecting lines. Said heat combining arrangement comprises means for filling steam and for applying pressure inside the tubes or pipes. Preferably, said pressure application inside the tubes or pipes is conducted by filling air, or other gas, e.g. steam into the tubes or pipes.

Preferably, there is also a control system in the apparatus to allow the apparatus according to the present invention to get out of the labor intensive industry, and to produce steel and plastic combined tubes or pipes of high quality, high pass rate and high yield with less labor work.

Preferably, the tubes or pipes conveying arrangement comprises a multi-functional (pneumatic or hydraulic or dynamo-electric) conveying carriage.

Preferably, the steel and plastic heat combining arrangement has a multi-functional (i.e. including direct or indirect process, direct process refers to direct steam heating, while indirect process means that the steam is heated by means of radiation) combining chamber, thereby the user has more choices.

Preferably, the steam circulating system contains a system for circulating supply of steam and a steam re-heating device and/or a steam supplementing system, which continuously supply reusable heating steam according to the real time pressure and heat requirement and under the control of the control system.

Said cooling and shaping device preferably use circulating water spraying device. Water soakage, gas or combination of gas and water can also be used as a cooling device. Preferably, it has a system for recovery and circulating of water and a control device.

Said control system preferably an automatic controlling system, which has monitor devices, display instruments, means for data inputting and a controlling device.

Said controlling device is preferably a NC device.

Preferably, the controlling device is equipped with corresponding sensors, which at least comprise sensors in the heat combining chamber, which detect various real time parameters. Preferably, said sensors evenly arranged in the steel and plastic combining chamber, and preferably to such an intensive extent that an optimum control of various parameters such as inflow speed, flow rate, time, temperature and pressure of the steam and the pressure of the compressed air, are guaranteed in the process of production of the steel and plastic combined tubes or pipes. Each technical parameter in the multi-functional combining chamber is automatically detected in the whole process and is automatically adjusted by an executive controller according to the given parameters of the process to the actual parameters in conformity with the given ones.

Preferably, said controlling system automatically records and stores various technical parameters in the process and/or plot of the technical parameters, and has the functions of copying, retrieving and searching.

The process parameters inputted through said input means include inflow speed and/or flow rate and/or time and/or temperature and/or pressure of the steam and/or the pressure of the compressed air.

Said controlling device comprises a temperature controller and/or a pressure controller and/or a gas valve controller and/or a steam valve controller and/or time difference controller.

Said conveying arrangement comprises lock means for locating, sealing and locking the tubes or pipes in the arrangement.

Whatever in the method or the apparatus for manufacture of the steel and plastic combined tubes or pipes, each above described preferred or alternative feature and/or solution and any combination thereof belongs to the whole solution of the present invention. Although not described one by one in detail, it is very easy for a person skilled in the art to embody the solutions composed of any combination of these features and/or solution after reading the present disclosure, which however is not obvious to combine these features into the solutions of the present invention before the present invention, which in fact is the fruit of the study and tests which took Mr. Zhang several years.

In conclusion, the process and apparatus according to the present invention makes a great progress in the field of steel and plastic heat combination, which results in increasing of the combination stability of the steel and plastic tubes or pipes and the pass rate, reducing of energy consumption and labor intensity substantially, and especially resolving of the problem that products with steel tubes or pipes of different spec or thick of wall, or with linings of different plastic can not be produced at different environmental temperature and/or different environmental humidity.

DESCRIPTION OF THE EMBODIMENTS

The following is the description of two preferred embodiments of the present invention by reference of the figures.

Figure 1A:
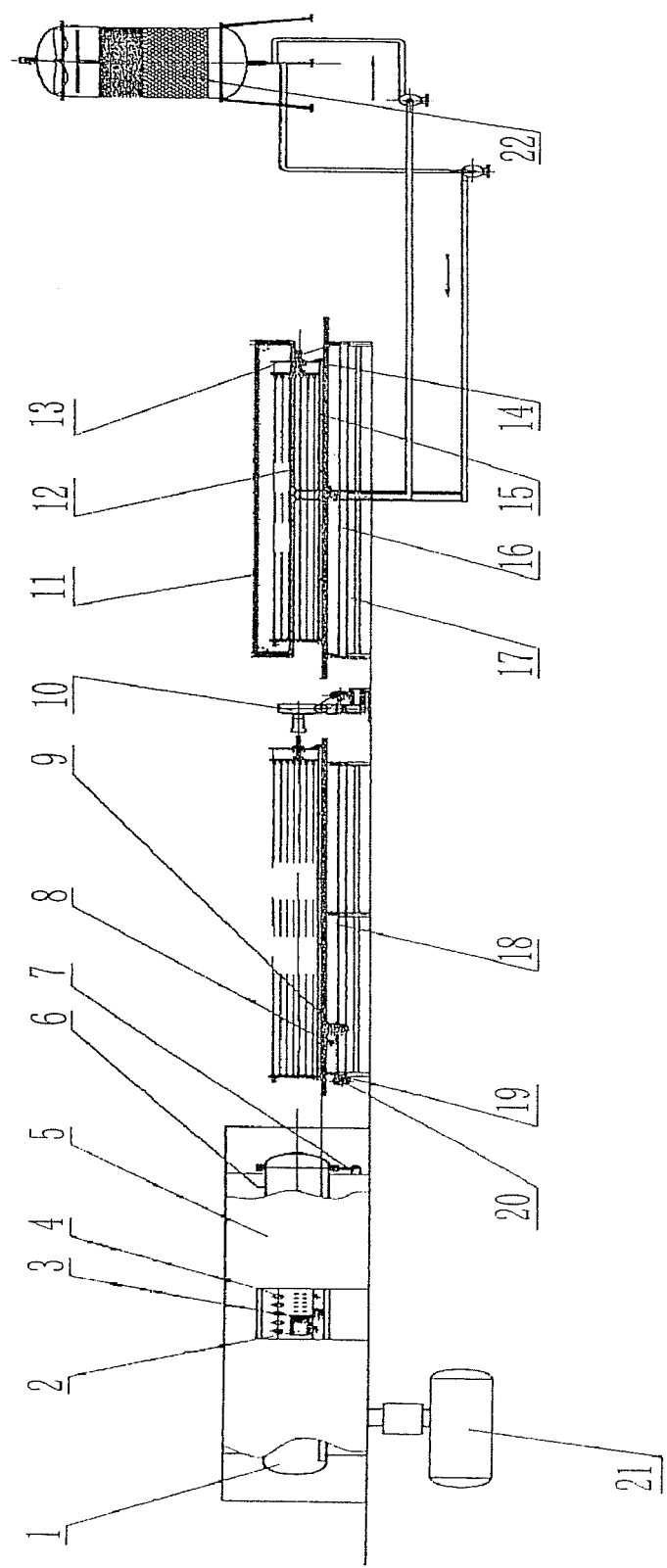
FIG. 1A schematically shows the structure and process flow of a single door apparatus for manufacture of steel and plastic combined tubes or pipes with a single door as a preferred embodiment.
Figure 1B:
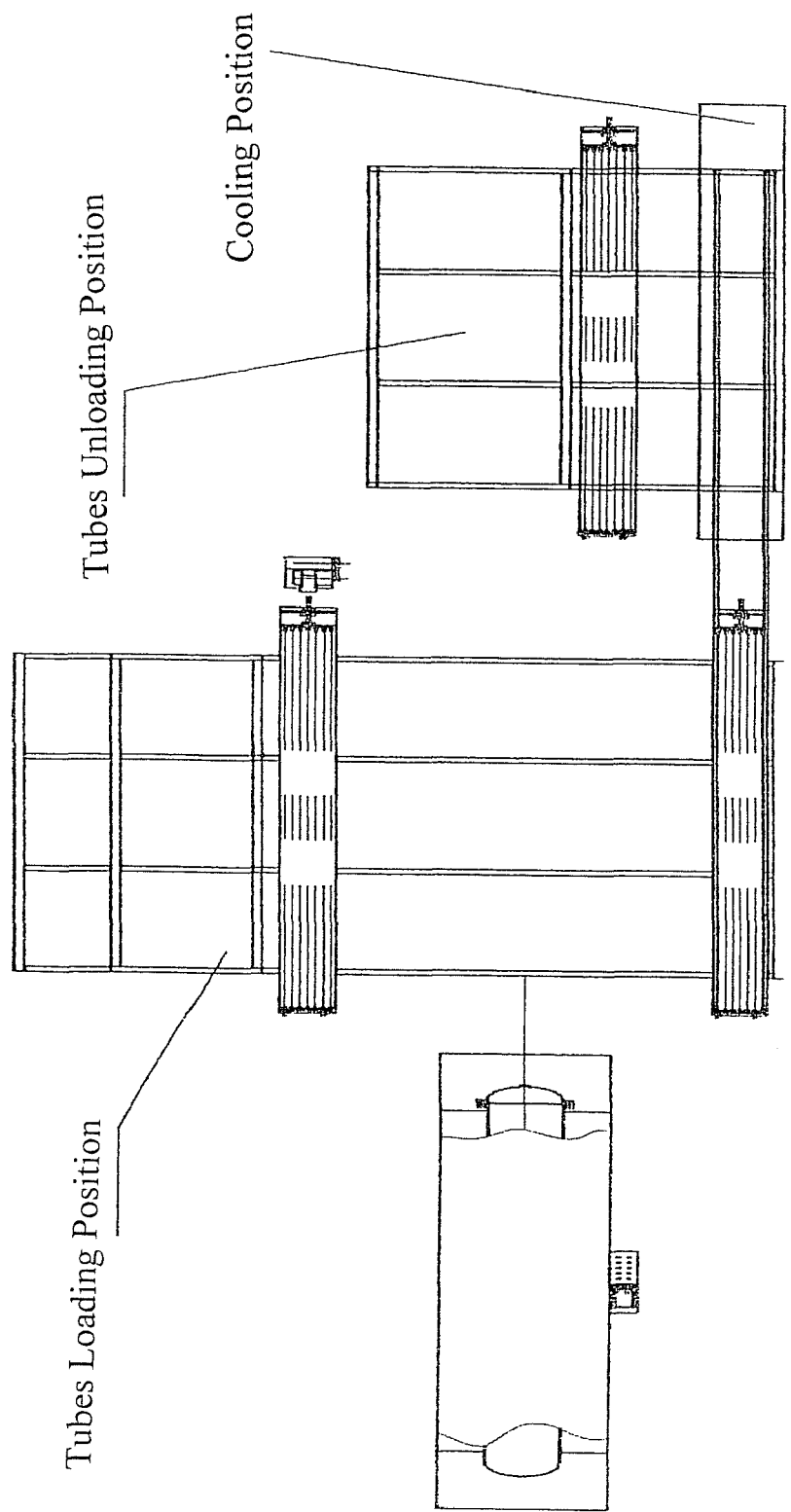
FIG. 1B shows the apparatus in FIG. 1 in tubes loading position, tubes unloading position and cooling position.

As shown in FIG. 1, a single door apparatus for combining steel tubes or pipes with plastic linings comprises a multi-functional combing chamber 1 and a multifunctional carriage 14 for conveying tubes or pipes. The tubes or pipes are loaded at a loading frame 18 and then are locked by means of pressing through automatic locking means 10. After passing an air tight test of the tubes or pipes the multifunctional carriage is conveyed into the multifunctional combining chamber 1 by transverse and longitudinal means 8, 9, 19 and 20. After the whole carriage is in the multifunctional combining chamber, electric and fluid circuits 6 are turned on according to the requirement of the operation, a teeth gearing or grabber sealing door is electrically or pneumatically closed by a locking device 7, the main apparatus body 3 and a display 2 are controlled by means of an intellectualized programmable computer to realize man-machine dialog. Upon obtaining corresponding information operation automatically begin, all of the steps of the combination process, such as filling steam into the chamber, filling gas into the tubes or pipes, reheating, increasing the temperature, thermal insulating and stabilizing the pressure are carried out automatically according to the given process line under monitor and control of the display instrument 4. Then the pressure is lowered by a steam recovery means 21 and the door is opened after an alarm, followed by actuation of the driving means to move the carriage 14 into cooling frame 16 along the rails 15 and 13, where the tubes or pipes are cooled and shaped in a limited time by the cooling and shaping arrangement 11, 12 and 17. The cooling water is pumped into a cooling tower 22 for cooling and circulation. After cooling and shaping, the carriage and the tubes or pipes on it are electrically or pneumatically or hydraulically moved into an unloading position. A process is completed.

Figure 2:
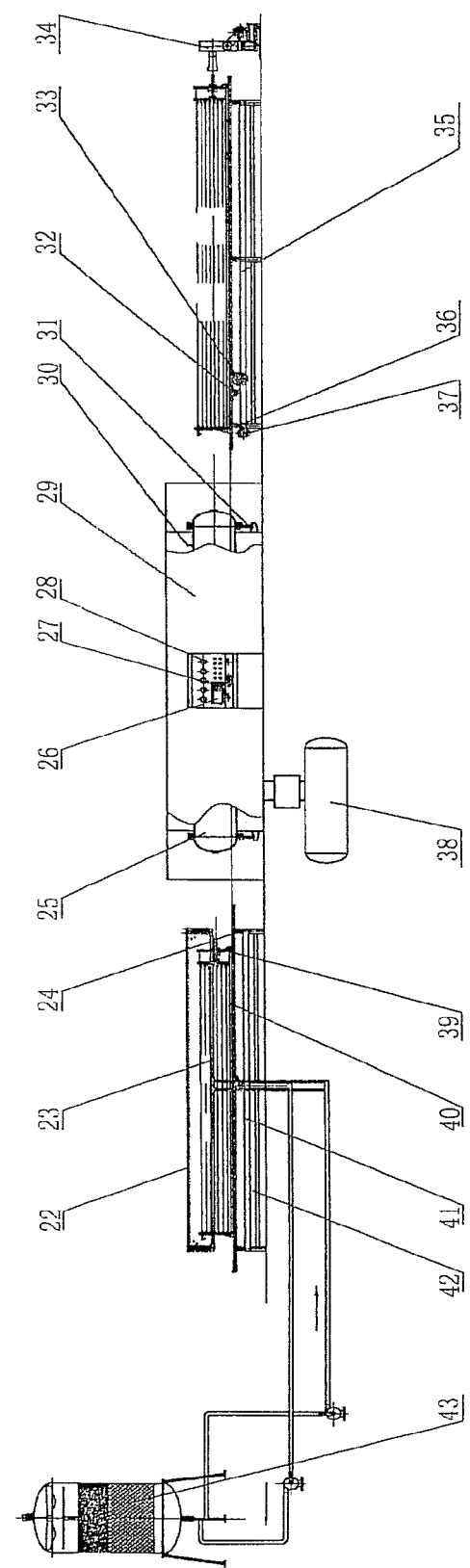
FIG. 2 schematically shows the structure and process flow of a double door apparatus for manufacture of steel and plastic combined tubes or pipes as another embodiment of the present invention.

FIG. 2 shows another embodiment of the apparatus for combination of the steel tubes or pipes with their linings of the present invention, i.e. the apparatus with two fast opening doors. As shown in FIG. 2, the tubes or pipes are automatically pressing locked by an electric locking means 34 after loaded in the multifunctional tube carriage 39 at a loading frame 35. After passing the air tight test, longitudinal and transverse driving means 32, 33, 36 and 37 drive the carriage into the combining chamber 25. After the whole carriage are in the multifunctional combining chamber, electric and fluid circuits 30 are turned on according to the requirement of the operation, a teeth gearing sealing door is closed by a locking device 31. Under monitor of a display instrument 28, the main apparatus body 27 and a display 26 are controlled by means of an intellectualized programmable computer to realize man-machine dialog. Upon obtaining corresponding information the operation automatically begin, all of the steps of the combining process, such as filling steam into the chamber, filling gas into and increasing the pressure of the tubes or pipes, reheating, increasing the temperature, thermal insulating and stabilizing the pressure are carried out automatically according to the given process line. Then the pressure is lowered by a steam recovery means 38 and the door is opened after an alarm, followed by actuation of the driving means to move the carriage 39 into position of a cooling frame 41 along the rails 24 and 40, where the tubes or pipes are cooled and shaped in a limited time by the cooling and shaping arrangement 22, 23 and 42. The cooling water is pumped into a cooling tower 22 for cooling and circulation. After cooling and shaping, the carriage and the tubes or pipes on it are moved into an unloading position. A process is completed.

Said closing of the sealing door by said locking means 31 can be carried out pneumatically or electrically or hydraulically.

The means for moving the carriage into the unloading position after cooling and shaping can be electric means or pneumatic means or hydraulic means.

Said teeth gearing sealing door can be substituted by a grabber sealing door.

Practice has proved that by using the apparatus according to the present invention, the pass rate of the products is increased from 97% as using the conventional apparatus to 99.9%, the production ability is substantially increased by 15% compared with conventional apparatus and generates great commercial value. Thanks to recovery and circulating of the steam, 3 tons steam is used if 40 tons tubes or pipes are produced each day. That means energy consumption reduces 405 RMB/day. By recovery and circulation of water, water consumption for one ton steel tubes or pipes lined with plastic linings reduces about 8%. The present invention also results in decreasing of labor intensity, which in turn reduces labor cost 5% or 10 RMB for one ton tubes or pipes.

The invention claimed is:

1. An apparatus for combining steel tubes or pipes with plastic linings, comprising an arrangement for heat combining steel tubes or pipes with their plastic linings which comprises:
    a multifunctional combining chamber having one or two door(s) for conveying the tubes or pipes into or out of it, which are located on the same end or both ends or in the middle of the arrangement for heat combining if it has two doors;
    an arrangement for conveying tubes or pipes with a multifunctional tube or pipe carriage; and
    a system for steam circulating that contains steam, is adapted to continuously supply re-usable steam to said chamber, and comprises a steam re-heater, and a steam supplementing device; and
    a device for cooling and shaping by means of water, gas or their combination; and
    an automatic controlling system, which comprises detecting device, displaying device, input means for inputting inflow speed, flow rate, time, temperature, and pressure of the steam, and pressure of the compressed gas, and a controlling device comprising a temperature controller, a pressure controller, a gas valve controller, a steam valve controller, and a time difference controller;
    wherein the steam contained in said steam circulating system comprises re-used steam;
    wherein direct or indirect steam heating of said tubes or pipes with plastic linings can be selectively realized in said multifunctional combining chamber; and
    wherein said multi-functional tube or pipe carriage is one which can be driven pneumatically, hydraulically, or electrically.

2. The apparatus of claim 1, wherein said cooling and shaping device comprises means for circulating water spraying having a system for recovery and circulation of the cooling water.

3. The apparatus of claim 1, wherein said cooling and shaping device comprises means for cooling by water soakage comprising a system for recovery and circulation of the cooling water.

4. The apparatus of claim 2, wherein said conveying arrangement comprises a lock device for locating, sealing, and locking the tubes or pipes in the conveying arrangement.

* * * * *